United States Patent
McCreary et al.

[15] 3,658,694
[45] Apr. 25, 1972

[54] METHOD OF TREATING FLUID HYDROCARBONS CONTAINING SULFUR AND OTHER IMPURITIES IN A SOLID REAGENT HYDROCARBON TREATER AND SEPARATOR

[72] Inventors: Elmer J. McCreary; Paul R. Hollis, Jr., both of Oklahoma City, Okla.

[73] Assignee: Phillips Petroleum Company

[22] Filed: Dec. 22, 1969

[21] Appl. No.: 887,285

[52] U.S. Cl. .................................................208/230, 23/3
[51] Int. Cl. ..........................................................C10g 19/00
[58] Field of Search ..........................208/230, 226; 23/3, 37

[56] References Cited

UNITED STATES PATENTS

| | | | |
|---|---|---|---|
| 2,884,377 | 4/1959 | Bozich et al. | 208/230 |
| 1,413,005 | 4/1922 | Cobb | 208/226 |
| 3,185,641 | 5/1965 | Cowden | 208/226 |
| 1,800,297 | 4/1931 | Jacobson | 23/3 |
| 2,311,593 | 2/1943 | Kalichevsky et al. | 208/230 |
| 3,428,575 | 2/1969 | Pijpers et al. | 252/468 |

*Primary Examiner*—Delbert E. Gantz
*Assistant Examiner*—J. M. Nelson
*Attorney*—Young and Quigg

[57] ABSTRACT

A method for the removal from a fluid hydrocarbon feedstream of sulfur, sulfur compounds, and acidic contaminants with a treating reagent and the separation of undesired, entrained reagent and reaction products from the hydrocarbon stream.

4 Claims, 1 Drawing Figure

Patented April 25, 1972
3,658,694
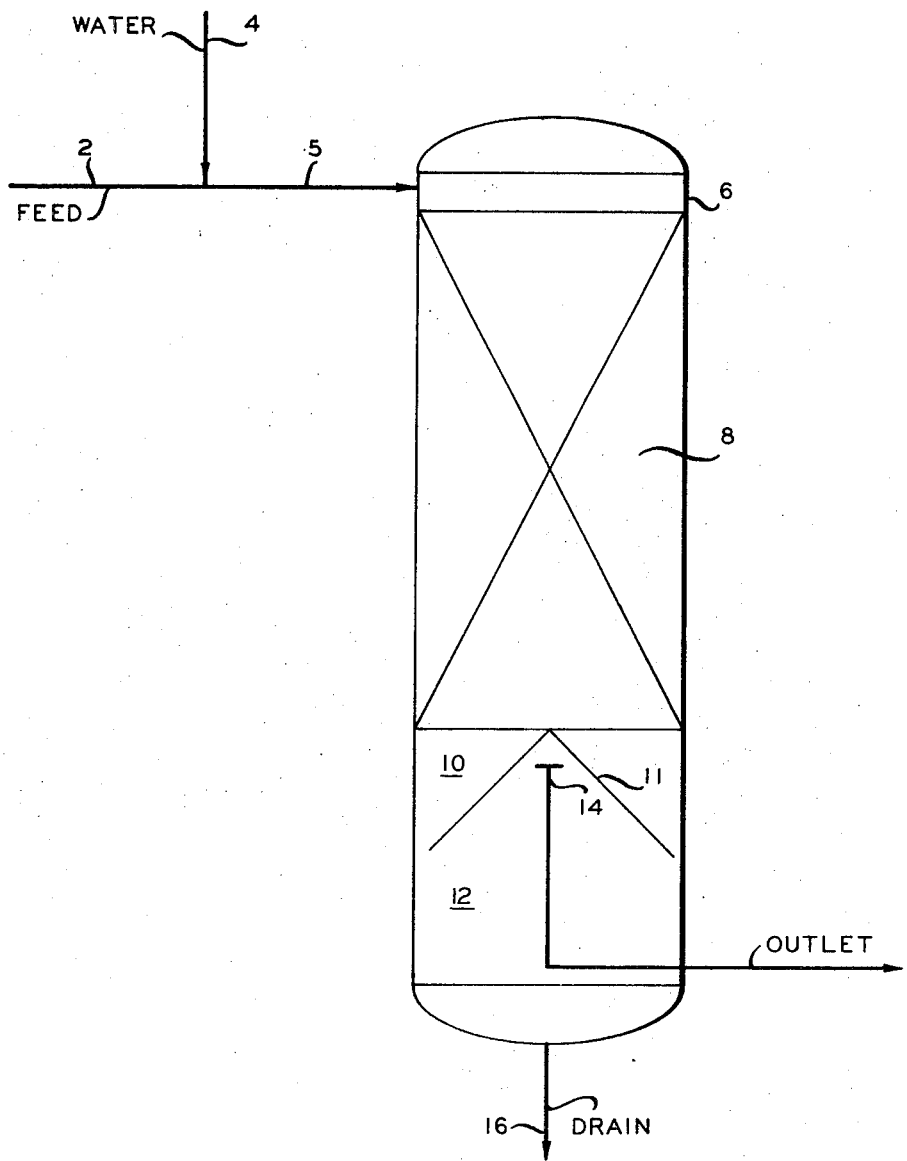
INVENTORS
E. J. McCREARY
P. R. HOLLIS, JR.
BY
*Young & Quigg*
ATTORNEYS

METHOD OF TREATING FLUID HYDROCARBONS CONTAINING SULFUR AND OTHER IMPURITIES IN A SOLID REAGENT HYDROCARBON TREATER AND SEPARATOR

This invention relates to a method for treating fluid hydrocarbons with a solid treating reagent. In one aspect this invention relates to a method for removing sulfur, sulfur compounds, and acidic contaminants from fluid hydrocarbons. In another aspect this invention relates to a method of separating reagent and reactants from a treated hydrocarbon fluid.

The art has proposed the employment of alkaline reagents and modifications thereof for the treatment of hydrocarbon streams containing sulfur contaminants. The industry has employed solutions of the alkaline reagents as well as the solid anhydrous state of these reagents.

The art through its use of alkali metal hydroxide solutions has faced the problem of expensive equipment needed to handle the considerable amount of reagent. The use of alkali metal hydroxide in a solid state eliminates some of these equipment costs, but multiple step treatment remains necessary. The art continues to face an efficiency problem in that a one-step method of treatment and separation is needed. Reagent regeneration, whether using molecular sieves or aqueous caustic and desiccant drying, leaves much to be desired in both equipment costs and efficiency.

It is an object of this invention to treat fluid hydrocarbons with solid particles of an alkali metal hydroxide.

It is another object of this invention to remove sulfur, sulfur compounds, and acidic contaminants from a fluid hydrocarbon stream.

It is another object of this invention to separate reagent and reactant particles from a treated hydrocarbon fluid.

We have discovered an improved method for the treatment of fluid hydrocarbons containing sulfur, sulfur compounds, and acidic components with solid particles of an alkali metal hydroxide. The resulting alkali metal sulfides and alkali metal hydroxide reagent remaining in the treated hydrocarbon fluid are removed from the hydrocarbon stream after the caustic treating step by a modified centrifuge method. The modified centrifuge separation occurs when the hydrocarbon stream flowing downward through the supported lump caustic bed experiences a velocity change as well as a change of direction, after leaving the caustic bed, thereby eliminating the heavy hydrocarbon insoluble particles from the fluid hydrocarbon stream. The undesired solids are removed from the fluid hydrocarbon stream due to the combined action of velocity increase and centrifugal action on the stream as it essentially reverses direction. The velocity of the fluid hydrocarbon stream is increased upon passing through a restricted flow area and then being released from the restriction.

Heretofore, liquid caustic treatment of hydrocarbons required a variety of equipment including a caustic mixing and storage tank, caustic charge pump, circulating pump, caustic-hydrocarbon contactor, hydrocarbon filter and desiccant units or dryers. Frequent regeneration of the dryers was necessary to assure that the hydrocarbon stream was sufficiently dry for commercial purposes.

Another method of treating hydrocarbons for the removal of sulfur, sulfur compounds, and acidic compounds has been through the use of molecular sieves. The magnitude of the regeneration costs of the molecular sieve method both in hydrocarbon loss and down time continues to present a major economic problem.

By the method of our invention a fluid hydrocarbon feedstream, for example gasoline, liquefied petroleum gas (LPG) or gaseous propane or butane containing sulfur, sulfur compounds, and acidic constituents is treated by an alkali metal hydroxide. Controlled amounts of water are injected into the fluid hydrocarbon feedstream before the stream is passed through the treating bed. A supported solid lump alkali metal hydroxide, for example potassium hydroxide, is used to treat the fluid hydrocarbon stream. The resulting alkali metal sulfide for example, formed by the reaction of potassium hydroxide and hydrogen sulfide, and entrained aqueous droplets of reagent are removed by the feedstream being subjected to a centrifuging action after leaving the caustic bed.

A gaseous feedstream accentuates the centrifuging separation since the velocity of the gas or vapor stream is increased as it flows through a flow restrictive zone in its downward path, and thereafter expands as the flow reverses its direction. During the directional change of the flow, the downward centrifuging of the undesired heavy particles of alkali metal hydroxide, alkali metal sulfides, and droplets of liquid, results in the production of a treated hydrocarbon gas or vapor substantially free of contaminants.

A liquid phase feedstream containing similar impurities is treated in the same manner except that the treater is operated liquid full and the downward centrifuging action is not as pronounced as when treating a vapor or gas phase.

Referring to the schematic drawing, a pressurized fluid stream 2 of liquid or gaseous hydrocarbons containing at least one of sulfur, sulfur compounds, and acidic contaminants is admixed with (liquid) water from conduit 4, and the admixture is passed via conduit 5 into the upper portion of treater-separator 6. Upon entry to the treater-separator 6, the prepared feedstream flows downward in contact with solid particles or lumps of caustic in bed 8, whereby the sulfur, sulfur compounds, and/or acidic impurities are reacted with the solid caustic in the presence of the injected water. The flow of the treated feedstream is then concentrated and accelerated in zone 10 as it passes downwardly between the outside walls of the treater-separator and the external walls of the inverted cone 11. The feedstream enters and expands in zone 12 after passing by the bottom rim of the inverted cone 11 where the stream changes direction, essentially reversing direction, and flows upward toward and exits through outlet conduit 14. The undesired heavy particles of alkali metal hydroxide, alkali metal sulfide, and hydrocarbon insoluble aqueous droplets are centrifuged toward the bottom of the treater-separator 6 and are drawn off by drain 16, resulting in a hydrocarbon stream substantially free of sulfur, sulfur compounds, and acidic contaminants removed via conduit 14.

EXAMPLE

The following table includes specific as well as broad ranges where applicable. The example illustrates charging a liquid hydrocarbon to the treater-separator.

TABLE I

| | Specific | Ranges |
|---|---|---|
| Propane Liquid Feed, Barrels/Day | 1,400**** | — |
| H$_2$S in Feed Propane, grains/100 cu. ft. of vapor***** | 1 | 0.2 to 5* |
| H$_2$O added, ppm by wt. based on propane | 30*** | 10 to 100** |
| KOH Reagent (walnut size), pounds in treater | 3,000 | — |
| H$_2$S in Treated Propane, grains/100 cu. ft. vapor | Nil****** | — |
| Operating Temperature, °F. | 100 | 40 to 160 |
| Operating Pressure, psia | 190 | ******* |
| Barrels Liquid C$_3$/No. KOH/Day | 0.47 | 0.1 to 1.5 |

*Varies in H$_2$S depending on source of propane.

**Depends, in part, on amount of H$_2$S in propane.

***We add about 1 gallon of water per day on 1,400 barrels/day of liquid propane having H$_2$S of 1 grain per 100 cubic feet of propane vapor.

****Quantity depends on size of apparatus

*****Although feed is liquid in the illustrative example, H$_2$S is determined and reported as grains (1/7,000 pound) of H$_2$S per 100 standard cubic feet of gaseous propane.

******The propane is sweet.

*******Sufficient to maintain liquid phase (when liquid phase as in this example).

What we claim is:

1. A method of treating fluid hydrocarbons containing sulfur, sulfur compounds, and acidic contaminants including the steps of: injecting from 10 to 100 parts per million by weight water, based on the fluid hydrocarbon, into the contaminated fluid hydrocarbon feedstream; introducing said feedstream downwardly through a supported solid lump alkali metal hydroxide bed; essentially reversing the direction of the feedstream flow and centrifuging downwardly heavy particles of alkali metal sulfides, alkali metal hydroxide and aqueous liquid particles from the upward flowing hydrocarbon fluid.

2. A method according to claim 1 wherein the hydrocarbon fluid is liquid propane.

3. A method according to claim 1 wherein the hydrocarbon fluid is gaseous propane.

4. A method according to claim 1 wherein the alkali metal hydroxide is potassium hydroxide.

* * * * *